United States Patent
Lee

(10) Patent No.: US 10,753,505 B2
(45) Date of Patent: Aug. 25, 2020

(54) CONTROL SYSTEM OF COOLANT CONTROL VALVE UNIT AND CONTROL METHOD THEREOF

(71) Applicants: Hyundai Motor Company, Seoul (KR); Kia Motors Corporation, Seoul (KR)

(72) Inventor: Yonggyu Lee, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/832,062

(22) Filed: Dec. 5, 2017

(65) Prior Publication Data
US 2019/0078703 A1  Mar. 14, 2019

(30) Foreign Application Priority Data
Sep. 13, 2017  (KR) .......................... 10-2017-0117087

(51) Int. Cl.
*F16K 31/524* (2006.01)
*F16K 31/04* (2006.01)
*F01P 7/16* (2006.01)
*F01P 7/14* (2006.01)

(52) U.S. Cl.
CPC .............. *F16K 31/524* (2013.01); *F01P 7/16* (2013.01); *F16K 31/04* (2013.01); *F16K 31/046* (2013.01); *F16K 31/52416* (2013.01); *F01P 2007/146* (2013.01); *F01P 2025/08* (2013.01); *F01P 2025/32* (2013.01); *F01P 2031/00* (2013.01); *F01P 2031/32* (2013.01)

(58) Field of Classification Search
CPC .............. F01P 2031/00; F01P 2031/20; F01P 2031/32; F16K 31/04; F16K 31/043; F16K 31/045; F16K 31/524
See application file for complete search history.

(56) References Cited

U.S. PATENT DOCUMENTS 8,701,603 B2* 4/2014 Warnery ................. F01P 7/167
123/41.08

FOREIGN PATENT DOCUMENTS

JP            2015-059615 A       3/2015

* cited by examiner

*Primary Examiner* — Lindsay M Low
*Assistant Examiner* — Ruben Picon-Feliciano
(74) *Attorney, Agent, or Firm* — Mintz Levin Cohn Ferris Glovsky and Popeo, P.C.; Peter F. Corless

(57) ABSTRACT

A control method of a coolant control valve unit that rotates a cam using torque of a motor and allowing a profile formed on the cam to push a rod to allow the valve formed on the rod to open/close a coolant passage, including steps of: rotating the cam by operating the motor; detecting a rotation position of the cam; determining a stuck state in which the cam or the motor is not rotated while the motor is operated; and performing an escape mode in which if it is determined that the cam or the motor is in the stuck state, the motor outputs a predetermined torque to the cam side in a predetermined rotation direction to escape the cam from the stuck state.

15 Claims, 8 Drawing Sheets

CONTROL SYSTEM OF COOLANT CONTROL VALVE UNIT AND CONTROL METHOD THEREOF

CROSS-REFERENCE TO RELATED APPLICATION

This application claims under 35 U.S.C. § 119(a) the benefit of Korean Patent Application No. 10-2017-0117087 filed in the Korean Intellectual Property Office on Sep. 13, 2017, the entire contents of which are incorporated herein by reference.

BACKGROUND

(a) Technical Field

The present disclosure relates to a control system and method of a coolant control valve unit capable of controlling a coolant flowing in each of the components of an engine according to a driving condition, determining a state in which a cam moving a valve is stuck during the control, and escaping the stuck cam.

(b) Description of the Related Art

An engine exhausts heat energy while generating torque by combusting fuel, and a coolant absorbs the heat energy while circulating through the engine, a heater, a radiator, or the like and emits the absorbed heat energy to the outside.

If a coolant temperature of the engine is low, viscosity of oil is increased and thus a frictional force and fuel consumption may be increased, and a temperature of exhaust gas is slowly increased and thus time to activate a catalyst may be increased and a quality of exhaust gas may deteriorate. In addition, time to normalize a function of the heater is increased, which may inconvenience a user.

If the coolant temperature of the engine is too high, knocking is caused. To suppress the knocking, ignition timing should be controlled, and therefore performance of the engine may deteriorate. If a lubricant temperature is excessively high, viscosity is low and thus a function of lubrication may deteriorate.

A system for controlling several cooling elements using one valve unit so as to keep the coolant temperature at a specific part of the engine high and the coolant temperature at other parts of the engine low has been applied.

In addition, a system for controlling coolant passing through a radiator, a heater core, an EGR cooler, an oil cooler, or a cylinder block using one coolant control valve unit has been considered. For example, this type of system is disclosed in Japanese Patent Laid-Open Publication No. 2015-59615.

As an example of the related art, the coolant control valve unit includes a motor, a cam rotated by the motor, a rod moving by a profile formed on one surface of the cam, and a valve formed on the rod, and has a structure in which the cam is rotated by the motor and the profile of the cam pushes the rod to allow the valve to open/close a coolant passage.

Meanwhile, if the cam enters the stuck state in which the cam is not rotated while the motor rotates the cam, the coolant passage may not be opened/closed by the valve. Therefore, the coolant may overheat or cooling efficiency may suddenly deteriorate.

Accordingly, a control method for escaping a coolant control valve unit in a stuck state in which the coolant control valve unit is not operated has been considered.

The above information disclosed in this Background section is only for enhancement of understanding of the background of the disclosure and therefore it may contain information that does not form the prior art that is already known in this country to a person of ordinary skill in the art.

SUMMARY

The present disclosure provides a control system of a coolant control valve unit capable of preventing a coolant from overheating and stably controlling cooling efficiency by quickly escaping a cam moving a valve in the coolant control valve unit from a state in which the cam is stuck not to move, and a control method thereof.

An exemplary embodiment of the present disclosure provides a control method of a coolant control valve unit which rotates a cam using torque of a motor and allowing a profile formed on the cam to push a rod to allow the valve formed on the rod to open/close a coolant passage, including: rotating the cam by operating the motor; detecting, by a rotation position detecting sensor, a rotation position of the cam; determining, by a controller, a stuck state in which the cam or the motor is not rotated while the motor is operated; and performing, by the controller, an escape mode in which if it is determined that the cam or the motor is in the stuck state, the motor outputs a predetermined torque to the cam side in a predetermined rotation direction to escape the cam from the stuck state.

The escape mode may include an oscillate escape mode in which the motor outputs a first forward torque and a first backward torque, and the first forward torque and the first backward torque are alternately output by a predetermined frequency at a predetermined period.

The escape mode may include a push escape mode in which the motor outputs a forward maximum torque or the motor outputs a backward maximum torque.

The escape mode may include a ramp escape mode in which the motor outputs a second forward torque by a predetermined frequency at a predetermined period or the motor outputs a second backward torque by a predetermined frequency at a predetermined period.

The escape mode may include: an oscillate escape mode in which the motor outputs a first forward torque and a first backward torque and alternately outputs the first forward torque and the second backward torque by a predetermined frequency at a predetermined period; a push escape mode in which the motor outputs a forward maximum output or the motor outputs a backward maximum torque; and a ramp escape mode in which the motor outputs a second forward torque for a predetermined frequency at a predetermined period or the motor outputs a second backward torque for a predetermined frequency at a predetermined period.

The first forward torque and the first backward torque may be an output torque of the motor in the rotating.

The forward maximum torque and the backward maximum torque may be a maximum output torque of the motor.

The second forward torque and the second backward torque may be the output torque of the motor in the rotating.

In the determination mode, the state in which the cam or the motor is not rotated may be determined, a generation frequency of the state may be counted, and if the counted value exceeds a predetermined value, it may be determined that the cam or the motor is in the stuck state.

After the escape mode is performed, if it is determined that the cam is not rotated, the cam may enter a failure mode.

Another embodiment of the present disclosure provides a control system of a coolant control valve unit, including: the coolant control valve unit including a cam operated by a motor to allow at least one valve to change an opening rate of a coolant passage; a rotation position detecting sensor sensing a rotation position of the cam; and a controller controlling power applied to the motor, receiving a signal from the rotation position detecting sensor, and if it is determined that the cam is stuck, performing a sticking escape mode in which the motor applies a predetermined torque to the cam side in a predetermined rotation direction to escape the cam from a stuck state.

One surface of the cam may be provided with a profile having a predetermined inclination and height in a rotation direction, and the coolant control valve unit may include a rod having a predetermined position provided with a valve and an elastic member elastically supporting the rod to the profile of the cam.

The controller may control the power applied to the motor in the escape mode to perform an oscillate escape mode in which the motor outputs a first forward torque and a first backward torque and alternately outputs the first forward torque and the first backward torque by a predetermined frequency at a predetermined period.

The controller may control the power applied to the motor in the escape mode to perform a push escape mode in which the motor outputs a forward maximum torque or the motor outputs a backward maximum torque.

The controller may control the power applied to the motor in the escape mode to perform a ramp escape mode in which the motor outputs a second forward torque by a predetermined frequency at a predetermined period or the motor outputs a second backward torque by a predetermined frequency at a predetermined period.

The controller may allow the motor to output the forward maximum torque if it is determined that the cam is stuck forward, and allow the motor to output the backward maximum torque if it is determined that the cam is stuck backward.

The controller may allow the motor to output the second forward torque if it is determined that the cam is stuck forward, and allow the motor to output the second backward torque if the cam is stuck backward.

According to an exemplary embodiment of the present disclosure, it is possible to quickly escape the cam from the stuck state by performing the escape mode if it is determined that the cam or the valve is stuck in the coolant control valve unit.

In addition, it is possible to quickly escape the cam from the stuck state by allowing the motor to alternately apply the first forward torque and the first backward torque to the cam side by the predetermined frequency at the predetermined period, in the oscillate escape mode.

In addition, it is possible to quickly escape the cam from the stuck state by allowing the motor to apply the backward maximum torque or the forward maximum torque to the cam side in the push escape mode.

In addition, it is possible to quickly escape the cam from the stuck state by allowing the motor to apply the second forward torque to the cam side by the predetermined frequency at the predetermined period or by allowing the motor to apply the second backward torque by the predetermined frequency at the predetermined period, in the ramp escape mode.

DETAILED DESCRIPTION OF THE EMBODIMENTS

Figure 1:
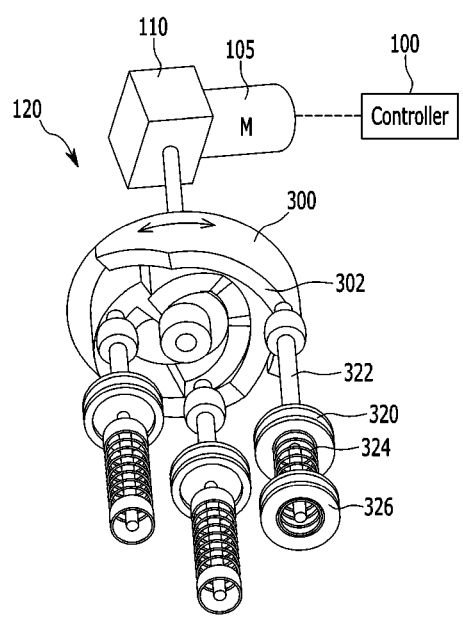
FIG. 1 is a partial perspective view of a coolant control valve unit according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an exemplary embodiment of the present disclosure will be described in detail with reference to the accompanying drawings.

However, since sizes and thicknesses of the respective components were arbitrarily shown in the accompanying drawings for convenience of explanation, the present disclosure is not necessarily limited to contents shown in the accompanying drawings. In addition, thicknesses may be exaggerated in order to obviously represent several portions and regions. Components that are the same as or are similar to each other will be denoted by the same reference numerals throughout the present specification.

In the following description, the same components are classified into first, second, and the like to differentiate names for components and a sequence thereof is not necessarily limited thereto.

FIG. 1 is a partial perspective view of a coolant control valve unit according to an exemplary embodiment of the present disclosure.

Referring to FIG. 1, a coolant control valve unit 120 includes a controller 100, a motor 105, a gear box 110, a cam 300, a profile 302, a rod 322, a valve 320, an elastic member 324, and a support member 326.

The controller 100 controls power applied to the motor 105 according to driving conditions such as coolant temperature, and the motor 105 rotates the cam 300 through the gear box 110.

The cam 300 has a disk shape, a lower surface of the cam 300 is provided with the profile 302 having a predetermined inclined surface in a rotation direction, and the profile 302 has a predetermined inclination and height.

An upper end of the rod 322 corresponds to the profile 302 of the cam 300, an intermediate part of the rod 322 is provided with the valve 320, and a lower surface of the valve 320 is supported on an upper part of the elastic member 324. Therefore, the upper end of the rod 322 comes into contact with the profile 302.

As illustrated in FIG. 1, the lower surface of the cam 300 is provided with three profiles 302, and three rods 322 and the valves 320 are configured to correspond to each profile 302.

Therefore, the coolant control valve unit 120 according to the exemplary embodiment of the present disclosure may control an opening rate of three coolant passages (not illustrated) by three valves 320. Here, the number of profiles 302 and valve 320 may be changed according to design specifications.

In addition, a structure of the coolant control valve unit according to the exemplary embodiment of the present disclosure is not limited to the description with reference to FIG. 1, and a known coolant control valve unit may be utilized.

Figure 2:
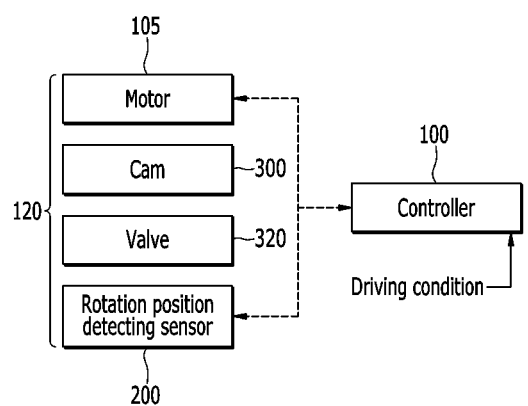
FIG. 2 is a schematic configuration diagram of a cooling system having a coolant control valve unit according to an exemplary embodiment of the present disclosure.

FIG. 2 is a schematic configuration diagram of a cooling system having a coolant control valve unit according to an exemplary embodiment of the present disclosure.

Referring to FIG. 2, a cooling system having the coolant control valve unit 120 includes the controller 100, the motor 105, the cam 300, the valve 320, and a rotation position detecting sensor 200.

The rotation position detecting sensor 200 detects rotation positions of the motor 105 or the cam 300 and transmits the detected signal to the controller 100. The controller 100 may select or calculate the rotation position and the rotation state of the cam 300 using the transmitted signal.

In addition, the controller 100 may control power applied to the motor 105 according to driving conditions (coolant temperature, etc.) to change the rotation position of the cam 300 to a predetermined position, thereby controlling the opening rate of the coolant passage using the valve 320.

The controller 100 may be implemented by at least one microprocessor operated by a predetermined program, in which the predetermined program may include a series of commands for executing a method according to an exemplary embodiment of the present disclosure to be described below.

Figure 3:
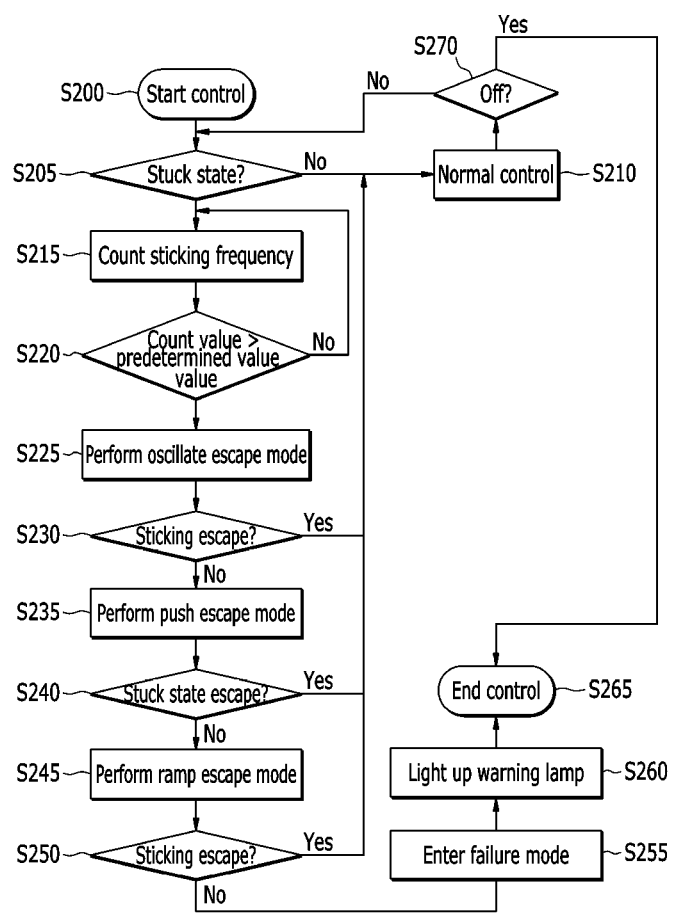
FIG. 3 is a flow chart of a control method of a coolant control valve unit according to an exemplary embodiment of the present disclosure.

FIG. 3 is a flow chart of a control method of a coolant control valve unit according to an exemplary embodiment of the present disclosure.

Referring to FIG. 3, in S200, the control starts, and in S205, it is determined whether the valve 320 or the cam 300 is stuck. In particular, a state in which the valve 320 or the cam 300 is stuck may be detected by the rotation position detecting sensor 200.

According to the exemplary embodiment of the present disclosure, the method for determining the state in which the cam 300 is stuck may determine the stuck state based on a difference value between a current rotation position and a target rotation position of the cam 300, and the method for determining the state in which the valve 320 or the cam 300 is stuck refers to the known technology, and a detailed description thereof will be omitted.

In S215, if it is determined that the valve 320 or the cam 300 is stuck, a sticking frequency is accumulated and counted. In S220, if it is determined that the accumulated count value exceeds a predetermined value, S225 is performed. In particular, if the accumulated count value does not exceed the predetermined value, S215 is performed again.

Figure 4:
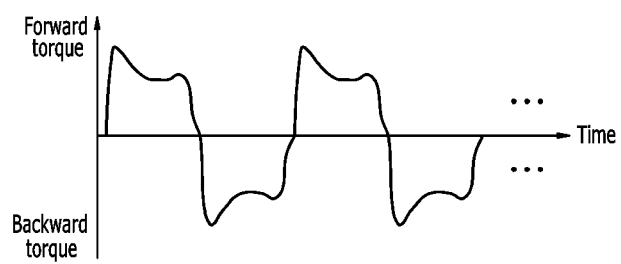
FIG. 4 is a graph illustrating an output torque of a motor in an oscillate escape mode according to an exemplary embodiment of the present disclosure.

In S225, an oscillate escape mode is performed. A content of the oscillate escape mode will be described with reference to FIG. 4. FIG. 4 is a graph illustrating an output torque of a motor in an oscillate escape mode according to an exemplary embodiment of the present disclosure.

Referring to FIG. 4, a horizontal axis represents time, and a vertical axis represents a forward torque and a backward torque applied from the motor 105, respectively.

In the oscillate escape mode, the controller 100 controls the motor 105 to allow the motor 105 to alternately apply a first forward torque and a first backward torque to the cam by a predetermined frequency at a predetermined period. In particular, the torque of the motor 105 is a torque for rotating the cam in a normal mode, and the output torque may suffer from a PI control.

Referring again to FIG. 3, in S230, it is determined whether the cam 300 or the valve 320 escapes from the stuck state. If it is determined that the cam 300 or the valve 320 escapes from the stuck state, S210 is performed so that the cam 300 or the valve 320 enters the normal mode.

Figure 5A:
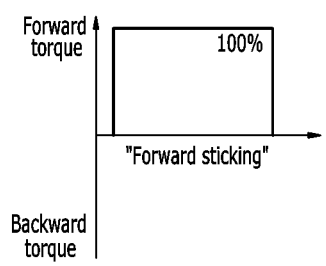
FIGS. 5A and 5B are graphs illustrating an output torque of a motor in a push escape mode according to an exemplary embodiment of the present disclosure.
Figure 5B:
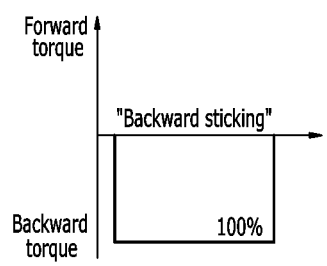

If it is determined that the cam 300 or the valve 320 does not escape from the stuck state, in S235, a push escape mode is performed. The push escape mode will be described with reference to FIGS. 5A-5B. FIGS. 5A-5B are graphs illustrating an output torque of a motor in a push escape mode according to an exemplary embodiment of the present disclosure.

Referring to FIG. 5A, in the case of forward sticking, the controller 100 controls the motor 105 to apply a forward maximum torque to the cam 300 for a predetermined time.

Referring to FIG. 5B, in the case of backward sticking, the controller 100 controls the motor 105 to apply a backward maximum torque to the cam 300 for a predetermined time.

According to the exemplary embodiment of the present disclosure, forward sticking represents the state in which the cam 300 or the valve 320 is stuck while the motor 105 is rotated forward, and backward sticking represents the state in which the cam 300 or the valve 320 is stuck while the motor 105 is rotated backward.

Referring back to FIG. 3, in S240, it is determined whether the cam 300 or the valve 320 escapes from the stuck state. If it is determined that the cam 300 or the valve 320 escapes from the stuck state, S210 is performed so that the cam 300 or the valve 320 enters the normal mode.

If it is determined that the cam 300 or the valve 320 does not escape from the stuck state, in S245, a ramp escape mode is performed. The ramp escape mode will be described with reference to FIGS. 6A-6B.

Figure 6A:
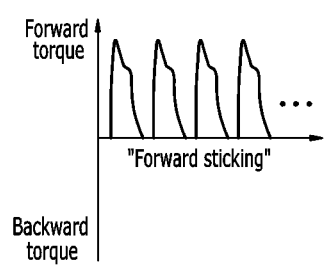
FIGS. 6A and 6B are graphs illustrating an output torque of a motor in a ramp escape mode according to an exemplary embodiment of the present disclosure.
Figure 6B:
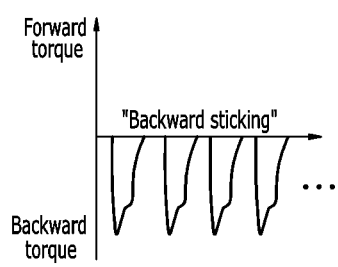

FIGS. 6A and 6B are graphs illustrating an output torque of a motor in a ramp escape mode according to an exemplary embodiment of the present disclosure.

Referring to FIG. 6A, in the case of forward sticking, the controller 100 controls the motor 105 to periodically apply a second forward torque to the cam 300 by a predetermined frequency.

Referring to FIG. 6B, in the case of backward sticking, the controller 100 controls the motor 105 to periodically apply a second backward torque to the cam 300 by a predetermined frequency.

Referring back to FIG. 3, in S250, it is determined whether the cam 300 or the valve 320 escapes from the stuck state. If it is determined that the cam 300 or the valve 320 escapes from the stuck state, S210 is performed so that the cam 300 or the valve 320 enters the normal mode.

If it is determined that the cam 300 or the valve 320 does not escape from the stuck state, in S255, the cam 300 or the valve 320 enters a failure mode and in S260, a warning lamp is lit up and the control ends (S265).

If a starting off signal is detected during the normal control S210, a control of S270 ends (S265).

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A control method of a coolant control valve unit rotating a cam using torque of a motor and opening/closing a coolant passage according to rotation of the cam, comprising:
    rotating the cam by operating the motor;
    detecting, by a rotation position detecting sensor, a rotation position of the cam;
    determining, by a controller, a stuck state in which the cam or the motor is not rotated while the motor is operated; and
    performing, by the controller, an escape mode in which if it is determined that the cam or the motor is in the stuck state, the motor outputs a predetermined torque to a cam side in a predetermined rotation direction to escape the cam from the stuck state,
    wherein the escape mode includes an oscillate escape mode in which the motor alternately outputs a first forward torque and a first backward torque, and the first forward torque and the first backward torque are alternately output by a predetermined frequency at a predetermined period.

2. The control method of claim 1, wherein the escape mode includes a push escape mode in which the motor outputs a forward maximum torque or the motor outputs a backward maximum torque.

3. The control method of claim 1, wherein the escape mode includes a ramp escape mode in which the motor outputs a second forward torque by a predetermined frequency at a predetermined period or the motor outputs a second backward torque by a predetermined frequency at a predetermined period.

4. The control method of claim 1, wherein the escape mode includes:
    an oscillate escape mode in which the motor outputs a first forward torque and a first backward torque and alternately outputs the first forward torque and the first backward torque by a predetermined frequency at a predetermined period;
    a push escape mode in which the motor outputs a forward maximum output or the motor outputs a backward maximum torque; and
    a ramp escape mode in which the motor outputs a second forward torque for a predetermined frequency at a predetermined period or the motor outputs a second backward torque for a predetermined frequency at a predetermined period.

5. The control method of claim 4, wherein the first forward torque and the first backward torque suffer from a PI control.

6. The control method of claim 4, wherein the forward maximum torque and the backward maximum torque are a maximum output torque of the motor.

7. The control method of claim 4, wherein the second forward torque and the second backward torque suffer from a PI control.

8. The control method of claim 1, wherein in the determination mode, a state in which the cam or the motor is not rotated is determined, a generation frequency of the state is counted, and if the counted value exceeds a predetermined value, it is determined that the cam or the motor is in the stuck state.

9. The control method of claim 1, wherein after the escape mode is performed, if it is determined that the cam is not rotated, the cam enters a failure mode.

10. A control system of a coolant control valve unit, comprising:
    the coolant control valve unit including a cam operated by a motor to allow at least one valve to change an opening rate of a coolant passage;
    a rotation position detecting sensor sensing a rotation position of the cam; and
    a controller containing program instructions that when executed control power applied to the motor, receiving a signal from the rotation position detecting sensor, if it is determined that the cam is stuck, perform a sticking escape mode in which the motor applies a predetermined torque to the cam side in a predetermined rotation direction to escape the cam from a stuck state,
    wherein the program instructions of the controller when executed control the power applied to the motor in the escape mode to perform an oscillate escape mode in which the motor alternately outputs a first forward torque and a first backward torque and alternately outputs the first forward torque and the first backward torque by a predetermined frequency at a predetermined period.

11. The control system of claim 10, wherein:
    one surface of the cam is provided with a profile having a predetermined inclination and height in a rotation direction, and
    the coolant control valve unit includes:

a rod having a predetermined position provided with a valve; and an elastic member elastically supporting the rod to the profile of the cam.

12. The control system of claim 10, wherein the program instructions of the controller when executed control the power applied to the motor in the escape mode to perform a push escape mode in which the motor outputs a forward maximum torque or the motor outputs a backward maximum torque.

13. The control system of claim 12, wherein the controller allows the motor to output the forward maximum torque if it is determined that the cam is stuck forward, and allows the motor to output the backward maximum torque if it is determined that the cam is stuck backward.

14. The control system of claim 10, wherein the program instructions of the controller when executed control the power applied to the motor in the escape mode to perform a ramp escape mode in which the motor outputs a second forward torque by a predetermined frequency at a predetermined period or the motor outputs a second backward torque by a predetermined frequency at a predetermined period.

15. The control system of claim 14, wherein the controller allows the motor to output the second forward torque if it is determined that the cam is stuck forward, and allows the motor to output the second backward torque if the cam is stuck backward.

* * * * *